United States Patent
Karasudani

(10) Patent No.: US 10,114,986 B2
(45) Date of Patent: Oct. 30, 2018

(54) SYSTEM, METHOD FOR INFORMATION DELIVERY, AND NON-TRANSITORY COMPUTER-READABLE STORAGE MEDIUM

(71) Applicant: FUJITSU LIMITED, Kawasaki-shi, Kanagawa (JP)

(72) Inventor: Akira Karasudani, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/359,008

(22) Filed: Nov. 22, 2016

(65) Prior Publication Data

US 2017/0169259 A1 Jun. 15, 2017

(30) Foreign Application Priority Data

Dec. 9, 2015 (JP) .................................. 2015-240667

(51) Int. Cl.
*G06K 7/10* (2006.01)
*G08B 13/14* (2006.01)
*G06Q 10/00* (2012.01)
*H04Q 5/22* (2006.01)
*H04W 12/08* (2009.01)
*H04L 29/06* (2006.01)
*G06F 21/35* (2013.01)
*G06F 15/16* (2006.01)
(Continued)

(52) U.S. Cl.
CPC .......... *G06K 7/10198* (2013.01); *G06Q 10/00* (2013.01)

(58) Field of Classification Search
CPC ...... G06K 7/10; G06K 7/10198; G08B 13/14; G05B 19/00; G06Q 10/00; H04Q 5/22; H04W 12/08; H04L 29/06; G06F 21/35

USPC ......... 340/10.1–10.5, 572.1, 505, 457.4, 5.3, 340/5.2, 5.23
See application file for complete search history.

(56) References Cited

U.S. PATENT DOCUMENTS 6,417,760 B1 * 7/2002 Mabuchi .................. G07C 1/10
235/382
7,551,086 B2 * 6/2009 Coop ..................... G06Q 50/30
340/572.1
(Continued)

FOREIGN PATENT DOCUMENTS

JP 2004-29984 1/2004
JP 2009-53877 3/2009
(Continued)

*Primary Examiner* — Nam V Nguyen
(74) *Attorney, Agent, or Firm* — Fujitsu Patent Center

(57) ABSTRACT

A system for information delivery includes: an electronic tag for holding a tag identifier being updatable; a server for storing the tag identifier held in the electronic tag and information corresponding to the tag identifier; and a terminal for causing the information corresponding to the tag identifier to be delivered from the server. The terminal includes a memory, and a processor coupled to the memory and configured to execute a process. The process executed by the processor includes reading the tag identifier from the electronic tag, updating the tag identifier in the electronic tag with a new tag identifier that is different in content from the tag identifier read from the electronic tag, and establishing, after updating the tag identifier in the electronic tag, a time period in which a discrepancy between the tag identifier in the electronic tag and the tag identifier stored in the server occurs.

6 Claims, 9 Drawing Sheets

(51) Int. Cl.
    *G06F 17/00*       (2006.01)
    *G08B 21/00*       (2006.01)

(56) References Cited

U.S. PATENT DOCUMENTS

| | | | |
|---|---|---|---|
| 7,761,347 B2 * | 7/2010 | Fujisawa | G06K 7/0008 |
| | | | 235/380 |
| 8,823,554 B2 * | 9/2014 | Yourkowski | G06Q 10/00 |
| | | | 235/385 |
| 8,991,692 B2 * | 3/2015 | Kumar | G06F 17/30011 |
| | | | 235/375 |
| 9,275,530 B1 * | 3/2016 | Perry | G08B 13/2462 |
| 9,325,807 B1 * | 4/2016 | Meoli | H04L 67/42 |
| 9,609,515 B2 * | 3/2017 | Tredoux | H04W 12/08 |
| 9,619,679 B2 * | 4/2017 | Sawyer | G01S 7/003 |
| 9,953,145 B2 * | 4/2018 | van Roermund | G06F 21/30 |
| 2003/0234718 A1 | 12/2003 | Fujisawa et al. | |

FOREIGN PATENT DOCUMENTS

| | | |
|---|---|---|
| JP | 2010-160673 | 7/2010 |
| WO | 2005/106680 | 11/2005 |

* cited by examiner

FIG. 3

| WORK NUMBER 312a | WORK NAME 312b | WORKER (USER) 312c | WORK DESTINATION 312d | WORK DATE AND TIME 312e | WORK LOCATION 312f |
|---|---|---|---|---|---|
| 555 | HOME-VISIT MEDICAL TREATMENT | DOCTOR β | HOME OF PATIENT A | 2015/9/29 11:00 | 1-1 Z-CHO, Y-KU, X-SHI |
| 556 | HOME-VISIT MEDICAL CARE | CAREGIVER γ | HOME OF PATIENT B | 2015/9/29 13:00 | 9-1 A-CHO, Y-KU, X-SHI |
| 557 | HOME-VISIT MEDICAL TREATMENT | DOCTOR β | HOME OF PATIENT C | 2015/9/30 10:00 | 5-2 Z-CHO, Y-KU, X-SHI |
| 558 | HOME-VISIT MEDICAL NURSING | NURSE α | HOME OF PATIENT A | 2015/10/1 9:00 | 1-1 Z-CHO, Y-KU, X-SHI |
| 559 | HOME-VISIT MEDICAL TREATMENT | DOCTOR β | HOME OF PATIENT A | 2015/10/2 9:00 | 1-1 Z-CHO, Y-KU, X-SHI |
| 556 | HOME-VISIT MEDICAL CARE | CAREGIVER γ | HOME OF PATIENT B | 2015/10/6 13:00 | 9-1 A-CHO, Y-KU, X-SHI |
| ... | | | ... | | |

312

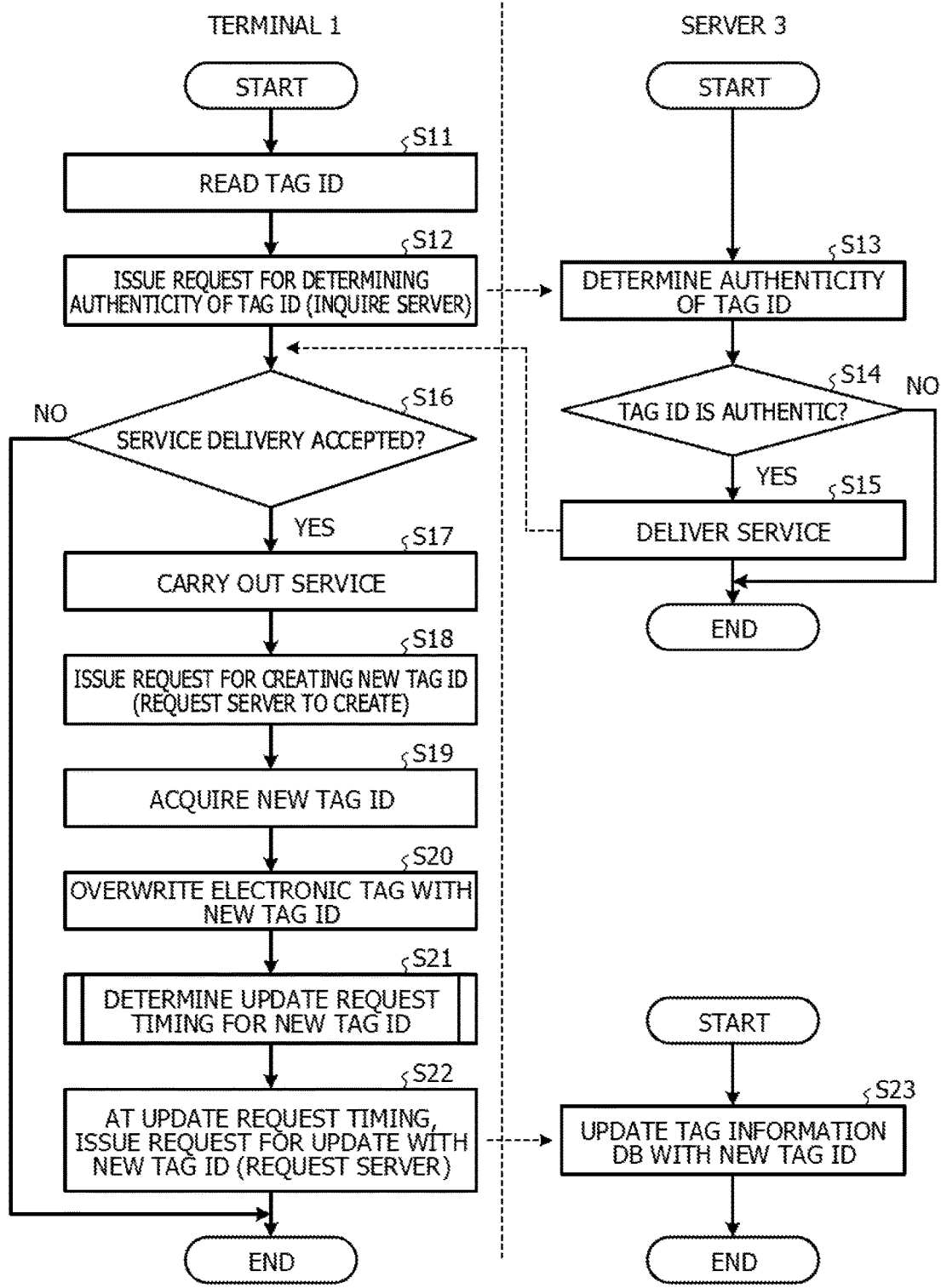

SYSTEM, METHOD FOR INFORMATION DELIVERY, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2015-240667, filed on Dec. 9, 2015, the entire contents of which are incorporated herein by reference.

FIELD

The embodiments discussed herein are related to a system, a method for information delivery, and a non-transitory computer-readable storage medium.

BACKGROUND

There is known a system in which the number unique to an electronic tag is managed. In such a system, an electronic device communicates wirelessly with an electronic tag to read the unique number in the electronic tag, and, if the unique number is a valid number, query a management server coupled via a network to verify the authenticity of the unique number. The management server calculates the probability of a forgery by referencing a history database, a black list database, a process transition rule, and the like, and then, if the probability is within a reference range, determines that the unique number is authentic, and, if the probability is out of the reference range, determines that the unique number is not authentic.

There is also known a system in which the identification number of an electronic tag is updated and the updated identification number is managed. In such a system, in response to an instruction for reading an identification number issued by an individual identification device, an individual identification tag reads and transmits an identification number held in the individual identification tag, and updates the identification number by a predetermined method. The individual identification device acquires the identification number read and transmitted in response to the instruction for reading the identification number held in the individual identification tag, and updates the identification number by the same method as with the individual identification tag. As an example of the related art, Japanese Laid-open Patent Publication No. 2004-29984, Japanese Laid-open Patent Publication No. 2009-53877, Japanese Laid-open Patent Publication No. 2010-160673, and International Publication Pamphlet No. WO 2005/106680 are known.

SUMMARY

According to an aspect of the invention, a system for information delivery includes: an electronic tag configured to hold a tag identifier that is updatable; a server configured to store the tag identifier held in the electronic tag and information corresponding to the tag identifier, and deliver information based on the tag identifier; and a terminal that configured to cause information corresponding to the tag identifier held in the electronic tag to be delivered from the server. The terminal includes a memory, and a processor coupled to the memory and configured to read the tag identifier from the electronic tag. The processor included in the terminal is configured to update the tag identifier in the electronic tag with a new tag identifier that is different in content from the tag identifier read from the electronic tag, and establish, after updating the tag identifier in the electronic tag, a time period in which a discrepancy between the tag identifier in the electronic tag and the tag identifier stored in the server occurs, by delaying a transmission timing of an update request to update the tag identifier stored in the server with the new tag identifier, or by causing the server to delay enabling the tag identifier stored in the server and updated with the new tag identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram depicting an example of a data structure of a work schedule DB;

FIG. 4 is a diagram illustrating an example of a flowchart of a process for information delivery according to the first embodiment;

DESCRIPTION OF EMBODIMENTS

Related-art techniques, by which even an arbitrary electronic device is able to read the identification number of an electronic tag, have an issue in that, if the read identification number is used, it is not possible to inhibit a third party who is not intended to possesses the electronic device that has read the identification number from impersonating a legitimate person.

For example, in the system in which the number unique to an electronic tag is managed, an electronic device possessed by a third party is able to communicate wirelessly with the electronic tag to read the unique number in the electronic tag. This allows the electronic device to query a management server about the authenticity of the unique number and further allows the management server to provide a determination that the unique number is authentic. Accordingly, the system is unable to inhibit the third party from impersonating a legitimate person.

In the system in which the identification number of an electronic tag is updated and the updated identification number is managed, an individual identification tag updates the identification number. However, if a third party possesses an individual identification device, in response to an instruction for reading an identification number held in the individual identification tag, the individual identification device acquires the identification number, and updates the identification number in the same method as with the individual identification tag. Accordingly, the individual identification device reads the same identification number as the identification number updated by the individual identification tag at the timing at which a response to the reading instruction is issued. Thus, it is not possible to inhibit the third party from impersonating a legitimate person.

As one aspect of the present embodiment, provided are solutions for being able to perform: in a system in which the identification number of an electronic tag is managed, inhibiting a third party who possesses an electronic device from impersonating a legitimate person by fraudulently using an identification number.

Hereinafter, embodiments of a system, program, and, method for information delivery will be described in detail with reference to the accompanying drawings. Note that the present disclosure is not intended to be limited to the embodiments.

Figure 1:
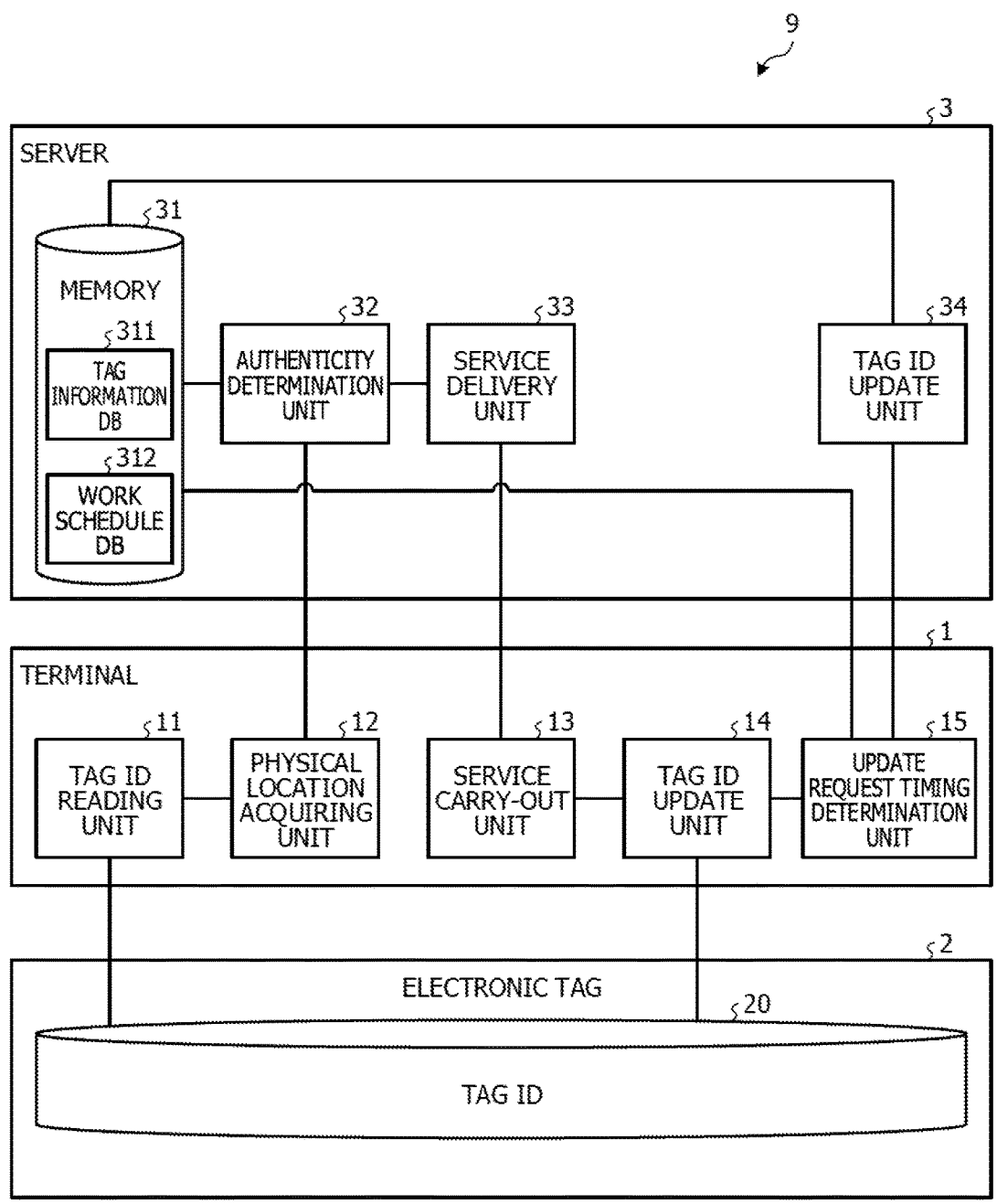
FIG. 1 is a block diagram illustrating a functional configuration of a system for information delivery according to a first embodiment.

<First Embodiment>FIG. 1 is a functional block diagram illustrating a functional configuration of a system for information delivery according to a first embodiment. As illustrated in FIG. 1, a system 9 for information delivery includes a terminal 1, an electronic tag 2, and a server 3. The system 9 delivers information desired for work in the workplace during working, in accordance with an operation (work) of a worker who possesses the terminal 1, from the server 3 to the terminal 1 by using a tag ID held by the electronic tag 2. For example, the system 9 is used for home-visit medical treatment of medical care in the home. That is, the system 9 delivers an electronic health record of a patient, which is used when a doctor visits the home of the patient, from the server 3 to the terminal 1 of the doctor by using a tag ID held by the electronic tag 2. Note that, hereinafter, the system 9 when used for home-visit medical treatment of medical care in the home will be described. However, by way of example and not of limitation, the system 9 is used for home-visit medical treatment of medical care in the home.

The terminal 1 has a global positioning system (GPS) functionality and is coupled to the electronic tag 2 and the server 3. The terminal 1 is coupled via wireless communication to the electronic tag 2. The wireless communication is, by way of example, wireless fidelity (Wi-Fi; registered trademark) or wireless communication of Bluetooth (registered trademark) standards, or may be any near-distance wireless communication.

The electronic tag 2 holds a tag identifier (ID) 20 unique to the tag and provides the held tag ID 20 to the terminal 1. The electronic tag 2 may be, for example, a near-field communication (NFC) tag or a Bluetooth low energy (BLE) beacon, but is not limited thereto. The electronic tag 2 is, by way of example, arranged in the home of a patient. Note that, when the electronic tag 2 is an NFC tag, the tag ID 20 represents an ID held in the user area of the electronic tag 2. When the electronic tag 2 is a BLE beacon, the tag ID 20 represents an ID of a universally unique identifier (UUID), MAJOR, and MINOR, or the like.

In addition, the terminal 1 is coupled via a network to the server 3. The network is, by way of example and not of limitation, the Internet, and may be an intranet or may be a network using a dedicated line.

In accordance with the work of a worker who possesses the terminal 1, the server 3 delivers information desired for work to the terminal 1. The server 3 includes a memory 31, an authenticity determination unit 32, a service delivery unit 33, and a tag ID update unit 34.

The memory 31 corresponds to a storage device of a nonvolatile semiconductor memory element, such as, for example, flash memory or Ferroelectric Random Access Memory (FRAM) (registered trademark). The memory 31 includes a tag information database (DB) 311 and a work schedule DB 312. The tag information DB 311 stores information about the respective electronic tags 2 arranged at a plurality of locations. The work schedule DB 312 stores the respective working schedules of a plurality of workers who use the system 9.

Figure 2:
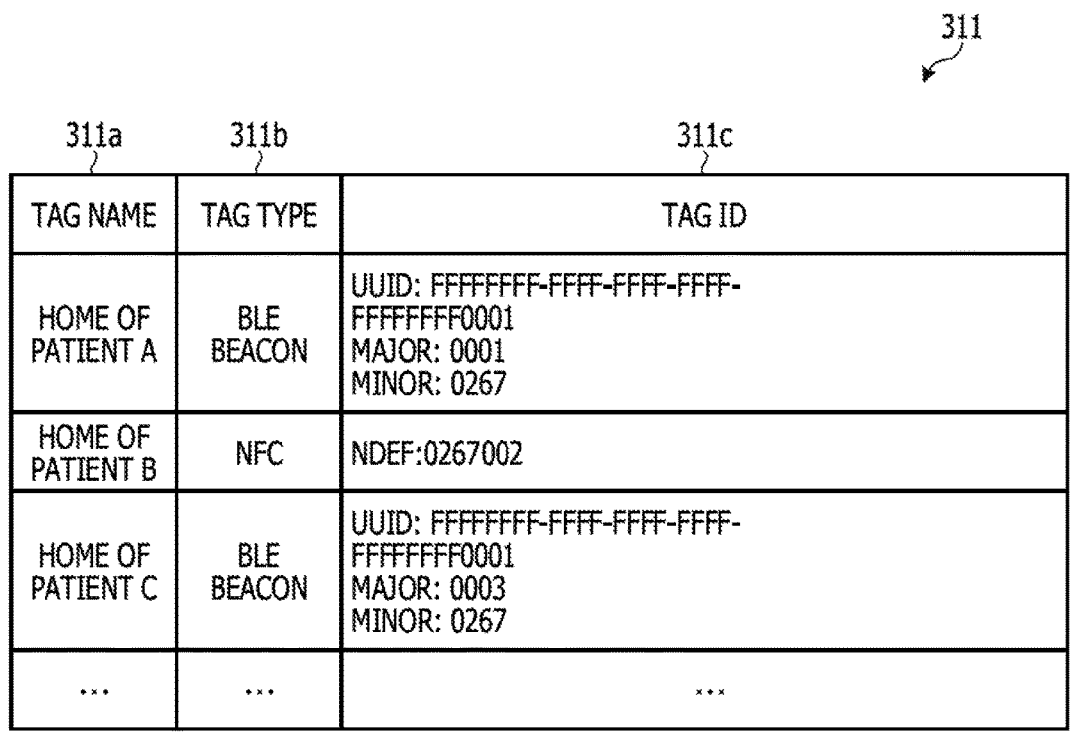
FIG. 2 is a diagram depicting an example of a data structure of a tag information database (DB)

With reference to FIG. 2 and FIG. 3, the data structures of the tag information DB 311 and the work schedule DB 312 will be described. FIG. 2 is a diagram depicting an example of a data structure of a tag information DB. As depicted in FIG. 2, the tag information DB 311 stores a tag name 311a, a tag type 311b, and a tag ID 311c in association with one another. The tag name 311a is a name uniquely representing the electronic tag 2. The tag type 311b refers to the tag type of the electronic tag 2. For the tag type 311b, "BLE beacon" and "NFC", which represents an NFC tag, are listed by way of example. The tag ID 311c refers to the identifier of the tag ID 20 held in the electronic tag 2.

By way of example, when the tag name 311a is "Home of patient A", "BLE beacon" as the tag type 311b and "UUID: FFFF ... MAJOR: 0001 MINOR: 0267" as the tag ID 311C are stored.

FIG. 3 is a diagram depicting an example of a data structure of a work schedule DB. As depicted in FIG. 3, the work schedule DB 312 stores a work number 312a, a work name 312b, a worker 312c, a work destination 312d, a work date and time 312e, and a work location 312f in association with one another. The work number 312a is a number associated with each work. By way of example, the work number 312a is associated with each worker 312c and each work destination 312d. The work name 312b represents the name of a work task. The worker 312c represents a person who carries out work. The work destination 312d represents a location where work is carried out. The work date and time 312e represents the date and time when work is carried out. The work location 312f represents the location of the work destination 312d. The work location 312f may be an address or may be the latitude and the longitude.

By way of example, when the work number 312a is "555", "Home-visit medical treatment" as the work name 312b, "Doctor β" as the worker 312c, and "Home of patient A" as the work destination 312d are stored. As the work date and time 312e, "2015/9/29 11:00" is stored, and, as the work location 312f, "1-1 Z-cho, Y-ku, X-shi". By referencing the work schedule DB 312, the terminal 1 is able to search for transitions in the work date and time of a worker who visits the same work destination.

Returning to FIG. 1, the authenticity determination unit 32 determines the authenticity of the tag ID 20. For example, upon receiving the physical location of the terminal 1 and the tag ID 20 from the terminal 1, the authenticity determination unit 32 determines the authenticity of the tag ID 20 by referencing the tag information DB 311 and the work schedule DB 312. By way of example, by referencing the work schedule DB 312, the authenticity determination unit 32 reads the work destination 312d of the work location 312f that matches the physical location of the terminal 1. At the time of referencing the work schedule DB 312, the work destination 312d that corresponds to the work location 312f, which matches the physical location of the terminal 1, and to the work date and time 312e, which matches the current time, may be a target to be read. Here, it is to be noted that the term "match" may be used as a concept that includes not only complete matching but also matching with a difference within a given range. By referencing the tag information DB 311, the authenticity determination unit 32 reads the tag ID 311c of the tag name 311a that matches the work destination represented by the read work destination 312d. That is, in the present embodiment, as depicted in examples of FIG. 2 and FIG. 3, the tag name 311a of the tag information DB 311 and the work destination 312d of the work schedule DB 312 are associated with each other. The authenticity determination unit 32 compares the tag ID represented by the read tab ID 311c with the tag ID 20 received from the terminal 1 to determine whether or not the tag IDs match. Then, if so, the authenticity determination unit 32 determines that the tag ID 20 is authentic. If not, the authenticity determination unit 32 determines that the tag ID 20 is not authentic. When it is determined that the tag ID 20 is authentic, the authenticity determination unit 32 outputs a determination that the tag ID 20 is authentic to the service delivery unit 33. Note that the method to determine the authenticity is not limited to this and may be a method that uses any related-art technique.

When receiving the determination that the tag ID 20 is authentic, the service delivery unit 33 delivers a service corresponding to the tag ID 20 to the terminal 1 that has issued a request for determining the authenticity of the tag ID 20. By way of example, the service delivery unit 33 delivers an electronic health record of a patient corresponding to the tag ID 20 to the terminal 1 that has issued a request for determining the authenticity of the tag ID 20.

The tag ID update unit 34 updates the tag information DB 311 by using a new tag ID 20 for which an update request has been issued by the terminal 1. For example, upon accepting an update request for the new tag ID 20 from the terminal 1, the tag ID update unit 34 updates, for example, the tag ID 311c corresponding to the tag name of the electronic tag 2 contained in the update request, among the tag IDs 311c in the tag information DB 311, with the new tag ID 20. In other words, the update request may contain, for example, the tag name of the electronic tag 2 and the tag ID.

Next, the terminal 1 illustrated in FIG. 1 will be described. The terminal 1 includes a tag ID reading unit 11, a physical location acquiring unit 12, a service carry-out unit 13, a tag ID update unit 14, and an update request timing determination unit 15.

The tag ID reading unit 11 reads the tag ID 20 from the electronic tag 2. For example, once the terminal 1 enters a range where the terminal 1 is able to communicate wirelessly with the electronic tag 2, the tag ID reading unit 11 transmits a reading request of the tag ID 20 to the electronic tag 2 and receives the tag ID 20 output from the electronic tag 2. By way of example, once the terminal 1 carried by a doctor enters a range where the terminal 1 is able to communicate wirelessly with the electronic tag 2 arranged in the home of a patient, the tag ID reading unit 11 transmits a reading request of the tag ID 20 to the electronic tag 2 and reads the tag ID 20 output from the electronic tag 2. The tag ID reading unit 11 outputs the read tag ID 20 to, for example, the physical location reading unit 12.

The physical location acquiring unit 12 acquires the physical location by using, for example, a GPS functionality. The physical location acquiring unit 12 transmits the acquired physical location and the tag ID 20 to the authenticity determination unit 32. The authenticity of the tag ID 20 is determined by the authenticity determination unit 32.

The service carry-out unit 13 carries out a service delivered from the server 3. By way of example, the service carry-out unit 13 displays an electronic health record of a patient delivered from the server 3 on a monitor of the terminal 1 carried by the doctor. Thereby, the service carry-out unit 13 is able to save the doctor time and energy for displaying the health record of a desired patient, allowing the doctor to smoothly and safely read information related to medical treatment.

The tag ID update unit 14 updates the tag ID 20 held in the electronic tag 2. For example, once the service is carried out by the service carry-out unit 13, the tag ID update unit 14 requests the server 3 to create a new tag ID. By way of example, the tag ID update unit 14 transmits a creation request of a new tag ID, which contains the current tag ID 20 and the physical location acquired by the physical location acquiring unit 12, to the server 3. The tag ID update unit 14 overwrites the tag ID 20 of the electronic tag 2 with the new tag ID 20 assigned by the server 2. Note that, at the time point at which the tag ID update unit 14 overwrites the tag ID 20 of the electronic tag 2 with the new tag ID, the tag ID update unit 34 of the server 3 has not yet overwritten the value of the tag information DB 311 with the new tag ID. Therefore, as a result of update of the electronic tag 2 performed by the tag ID update unit 14, the tag ID 20 of the electronic tag 2 does not match the tag ID 311c of the tag information DB 311 at least until an update request timing described below arrives. The tag ID update unit 14 outputs the overwritten new tag ID 20 to the update request timing determination unit 15.

At a given timing, the update request timing determination unit 15 requests the server 3 to perform update with the new tag ID 20 that has been updated by the tag ID update unit 14. For example, the update request timing determination unit 15 references the work schedule DB 312 and, at any timing before the next reading of the tag ID 20 from this electronic tag 2, requests the server 3 to perform update with the new tag ID 20. The given timing is, for example, immediately before the date and time (the data and time of work) at which a worker next visits this work destination to carry out work. Thereby, the update request timing determination unit 15 is able to learn the work destination (the tag name) from the work schedule DB 312. In other words, in the present embodiment, since the tag name 311a of the tag information DB 311 is associated with the work destination 312d of the work schedule DB 312, the update request timing determination unit 15 is able to learn the tag name 311a from the work destination 312d by referencing the work schedule DB 312.

The determination of whether or not the time is immediately before the date and time of the next visit is made, for example, as follows. By way of example, when work is not shared with another person, the update request timing determination unit 15 references the work schedule DB 312 and acquires the work date and time 312e and the work location 312f of the next work schedule from among records that correspond to the worker 312c who is currently working and the work destination 312d of the current work. That is, when work is not shared with another person, the update request timing determination unit 15 acquires a timing at which the same worker as the worker who is currently working will next visit the same work destination to carry out the same work. In addition, when work is shared with another person, the update request timing determination unit 15 references the work schedule DB 312 and acquires the work date and time 312e and the work location 312f of the record of the next work schedule, among records that correspond to the worker 312c who currently shares work and the work destination 312d of the currently shared work. That is, when work is shared with another person, the update request timing determination unit 15 acquires a timing at which a worker who currently shares work will next visit the same work destination to carry out the same work. Further, if the update request timing determination unit 15 acquires only the work date and time 312e, the update request timing determination unit 15 issues a request for update with the new tag ID 20 a specified amount of time prior to the work date and time 312e. By way of example and not of limitation, the specified amount of time is 30 minutes. If the update request timing determination unit 15 acquires only the work location 312f, the update request timing determination unit 15 issues a request for update with the new tag ID 20 when the next worker 312c is close, within a specified distance, to the work location 312f. By way of example and not of limitation, the specified distance is 1 km. If the update request timing determination unit 15 acquires the work date and time 312e and the work location 312f, the update request timing determination unit 15 issues a request for update with the new tag ID 20 when the next worker 312c is close at the specified distance to the work location 312f the specified amount of time prior to the work date and time 312e.

With reference to FIG. 4, an example of a procedure of a process for information delivery according to the first embodiment will be described. FIG. 4 is a diagram illustrating an example of a flowchart of a process for information processing according to the first embodiment. The terminal 1 is assumed to enter a range where the terminal 1 is able to communicate wirelessly with the electronic tag 2.

As illustrated in FIG. 4, in the terminal 1, the tag ID reading unit 11 reads the tag ID 20 from the electronic tag 2 (S11). The physical location acquisition unit 12 acquires the physical location of the terminal 1, transmits the acquired physical location and the tag ID 20 to the server 3, and requests the server 3 to determine the authenticity of the tag ID 20 (S12).

In the server 3, the authenticity determination unit 32 references the tag information DB 311 and the work schedule DB 312 to determine the authenticity of the tag ID 20 (S13). The authenticity determination unit 32 determines whether or not the tag ID 20 is authentic (S14). If it is determined that the tag ID 20 is authentic (Yes in S14), the service delivery unit 33 delivers a service corresponding to the tag ID 20 to the terminal 1 (S15). On the other hand, if it is determined that the tag ID 20 is not authentic (No in S14), the service delivery unit 33 terminates the process for information delivery.

In the terminal 1, the service carry-out unit 13 determines whether or not delivery of a service has been accepted (S16). If it is determined that delivery of a service has not been accepted (No in S16), the service carry-out unit 13 terminates the process for information delivery. On the other hand, if it is determined that delivery of a service has been accepted (Yes in S16), the service carry-out unit 13 carries out the accepted service (S17).

The tag ID update unit 14 requests the server 3 to create a new tag ID (S18). The tag ID update unit 14 acquires the new tag ID created by the server 3 from the server 3 (S19). The tag ID update unit 14 overwrites the tag ID 20 of the electronic tag 2 with the new tag ID (S20). The update request timing determination unit 15 determines an update request timing with the new tag ID 20 (S21). Note that an update request timing determination process will be described below.

Further, at the update request timing determined in the update request timing determination process, the update request timing determination unit 15 requests the server 3 to perform update with the new tag ID 20 (S22).

In the server 3, the tag ID update unit 34 updates the tag information DB 311 with the new tag ID 20, with which the server 3 has been requested to perform update by the terminal 1 (S23).

Figure 5:
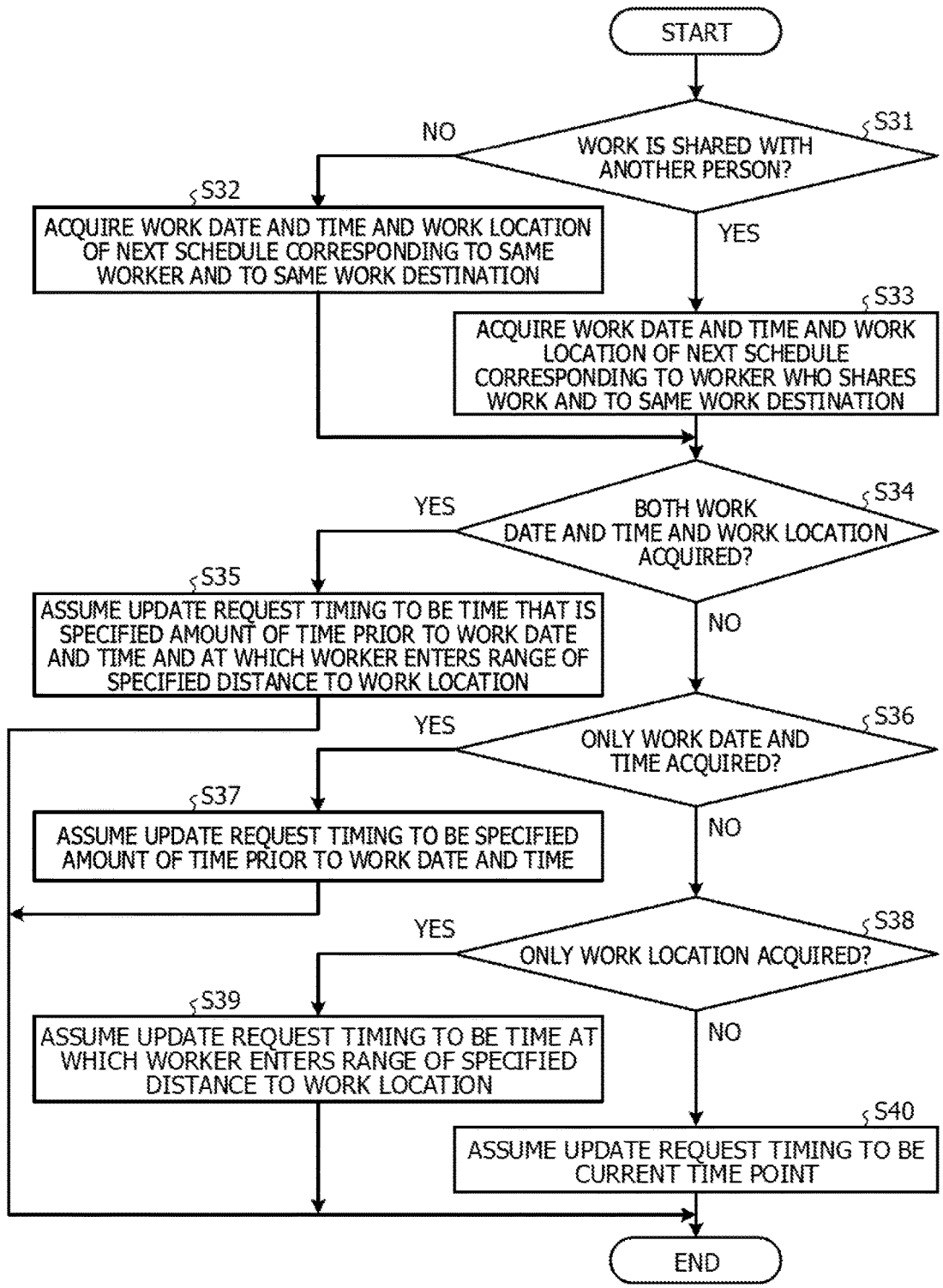
FIG. 5 is a diagram illustrating an example of a flowchart of an update request timing determination process according to the first embodiment.

With reference to FIG. 5, an example of a procedure of an update request timing determination process according to the first embodiment will be described. FIG. 5 is a diagram illustrating an example of a flowchart of an update request timing determination process according to the first embodiment.

The update request timing determination unit 15 determines whether or not work is shared with another person (S31). For example, the update request timing determination unit 15 makes the determination, by reference to the work schedule DB 312, depending on whether or not, among records that match in terms of the work name and the work destination of the work that is currently being carried out, any one record differs from the other records in terms of the worker 312c.

If it is determined that the work is not shared with another person (No in S31), the update request timing determination unit 15 references the work schedule DB 312 and acquires the work date and time and the work location of the next schedule corresponding to the same worker and to the same work destination (S32). For example, the update request timing determination unit 15 references the work schedule DB 312 and acquires the work date and time 312e and the work location 312f of a record of the next work schedule, among records corresponding to the worker 312c who is currently working and to the work destination 312d of the current work. Then, the update request timing determination unit 15 proceeds to S34.

On the other hand, if it is determined that the work is shared with another person (Yes in S31), the update request timing determination unit 15 acquires the work date and time and the work location of the next schedule corresponding to a worker who shares the work and to the same work destination (S33). For example, the update request timing determination unit 15 references the work schedule DB 312 and acquires, among records corresponding to the worker 312c who currently shares the work and to the work destination 312d of the current work, the work date and time 312e and the work location 312f of a record of the next work schedule. Then, the update request timing determination unit 15 proceeds to S34.

The update request timing determination unit 15 determines whether or not both the work date and time and the work location have been acquired (S34). If it is determined that both the work date and time and the work location have been acquired (Yes in S34), the update request timing determination unit 15 assumes the update request timing to be a time that is the specified amount of time prior to the work date and time and at which the worker enters the range of the specified distance to the work location (S35). Then, the update request timing determination unit 15 terminates the update request timing determination process.

On the other hand, if it is determined that both the work date and time and the work location have not been acquired (No in S34), the update request timing determination unit 15 determines whether or not only the work date and time has been acquired (S36). If it is determined that only the work date and time has been acquired (Yes in S36), the update request timing determination unit 15 assumes the update request timing to be a time that is the specified amount of time prior to the work date and time (S37). Then, the update request timing determination unit 15 terminates the update request timing determination process.

On the other hand, if it is determined that only the work date and time has not been acquired (No in S36), the update request timing determination unit 15 determines whether or not only the work location has been acquired (S38). If it is determined that only the work location has been acquired (Yes in S38), the update request timing determination unit 15 assumes the update request timing to be a time at which the worker enters the range of the specified distance to the work location (S39). Then, the update request timing determination unit 15 terminates the update request timing determination process.

On the other hand, if it is determined that only the work location has not been acquired (No in S38), the update request timing determination unit 15 assumes the update request timing to be the current time point (S40). Then, the update request timing determination unit 15 terminates the update request timing determination process.

In this way, in the first embodiment described above, the system 9 includes the terminal 1, the electronic tag 2, and the server 3. The terminal 1 reads the tag ID 20 from the electronic tag 2 and updates the tag ID 20 in the electronic tag 2 with a new tag ID 20 that is different from the read tag ID 20. The terminal 1 references the work schedule DB 312 and, at a timing before the next reading of the tag ID 20 from the electronic tag 2, requests the server 3 to perform update with the updated tag ID 20. Upon requested to perform update by the terminal 1, the server 3 updates the tag information DB 311 with the updated tag ID 20. According to such a configuration, each time the user uses information delivery, the system 9 updates the tag ID 20 of the electronic tag 2 and avoids reflecting the update in the server 3 until a timing before the tag ID 20 is next read from the electronic tag 2. Accordingly, even if a third party copies the tag ID 20 read from another terminal 1 possessed by the third party or by the terminal 1 that has been stolen, it is possible to inhibit the third party from impersonating a legitimate person by using the copied tag ID 20. That is, the system 9 determines the timing at which the tag ID 20 updated in the electronic tag 2 is to be reflected in the tag information DB 311 of the server 3, and performs update. Therefore, the tag ID 20 is not able to be used until the update timing. This makes it possible to improve the safety. In addition, the system 9 implements such a configuration without adding hardware to the electronic tag 2, making it possible to implement the configuration at low cost.

<Second Embodiment> Description has been given of the system 9 according to the first embodiment in which, at the given timing, the terminal 1 requests the server 3 to perform update with the new tag ID 20 that has been updated in the electronic tag 2 and, upon receipt of the update request, the server 3 reflects the new tag ID 20. However, in the system 9, which is not limited to this, although, upon receipt of an update request, the server 3 performs update with the new tag ID 20, the server 3 may enable the updated tag ID 20 at a given timing.

Accordingly, description will be given of the case where, in the system 9 according to the second embodiment, although, upon receipt of an update request, the server 3 performs update with the new tag ID 20, the server 3 enables the updated tag ID 20 at a given timing.

Figure 6:
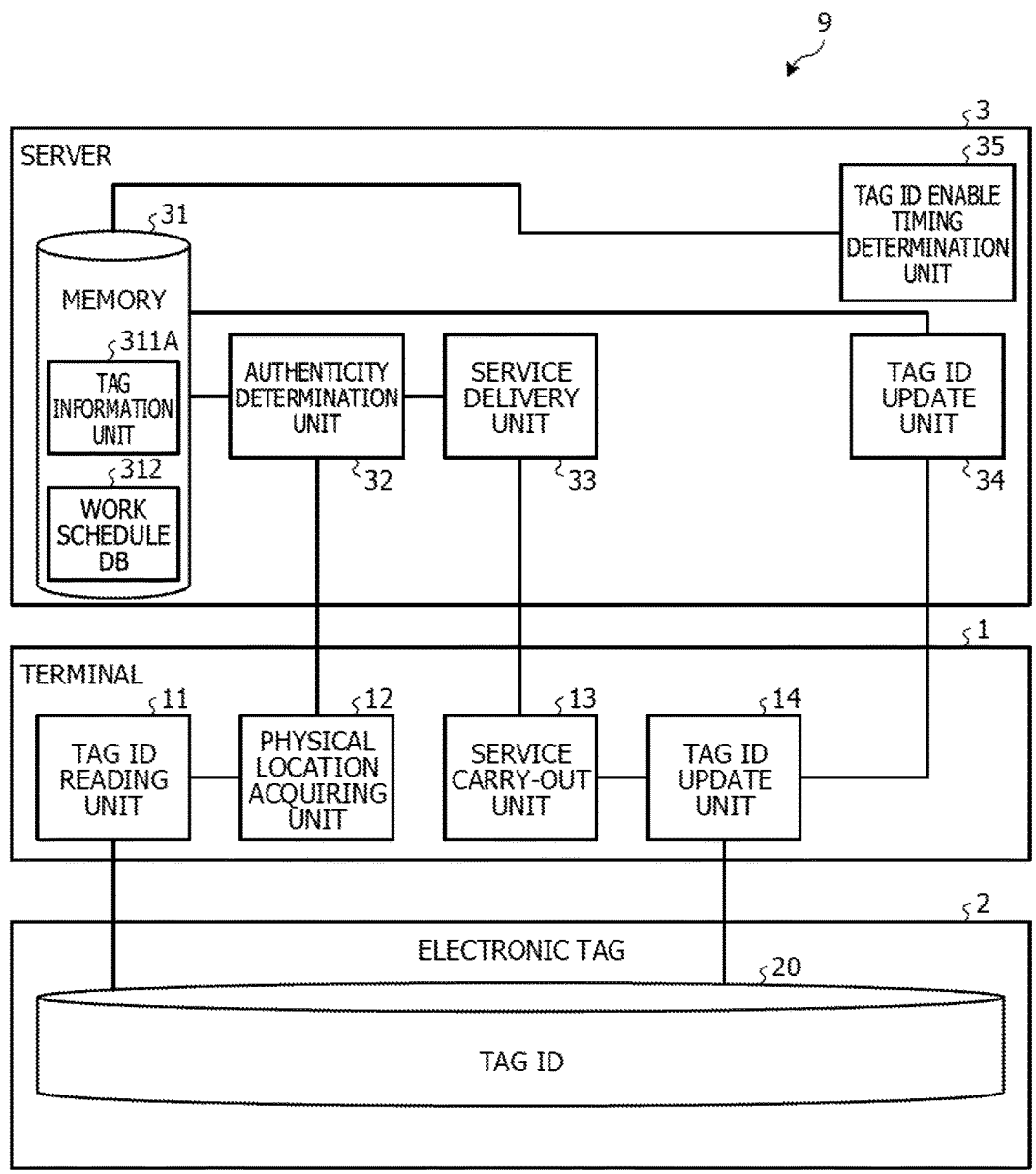
FIG. 6 is a block diagram illustrating a functional configuration of a system for information delivery according to a second embodiment.

FIG. 6 is a block diagram illustrating a functional configuration of a system for information delivery according to the second embodiment. Note that the same configurations as in the system 9 illustrated in FIG. 1 are denoted by the same reference numerals and thus the overlapping configurations and operations are not described. In the terminal 1, the first embodiment differs from the second embodiment in that the update request timing determination unit 15 is removed. In the server 3, the first embodiment differs from the second embodiment in that a tag ID enable timing determination unit 35 is added. The embodiments also differ in that a tag information DB 311A is changed.

Figure 7:
FIG. 7 is a diagram depicting an example of a data structure of a tag information DB.

Here, the data structure of the tag information DB 311A will be described with reference to FIG. 7. FIG. 7 is a diagram depicting an example of a data structure of a tag information DB. As depicted in FIG. 7, the tag information DB 311A stores the tag name 311a, the tag type 311b, the tag ID 311c, and an enable 311d in association with one another. The tag name 311a is a name uniquely representing the electronic tag 2. The tag type 311b refers to the tag type of the electronic tag 2. For the tag type 311b, by way of example, "BLE beacon" and "NFC", which represents an NFC tag, are listed. The tag ID 311c refers to an identifier of the tag ID 20 held in the electronic tag 2. The enable 311d is a flag indicating whether or not the tag ID represented by the tag ID 311c is enabled or disabled. For the enable 311d, by way of example, "TRUE" representing that the tag ID is enabled, and "FALSE" representing that the tag ID is disabled are listed.

By way of example, when the tag name 311a is "Home of patient A", "BLE beacon" as the tag type 311b, "UUID: FFFF . . . MAJOR: 0001 MINOR: 0267" as the tag ID 311c, and "TRUE" as the enable 311d are stored.

The tag ID update unit 14 updates the tag ID 20 held in the electronic tag 2. For example, once a service is carried out by the service carry-out unit 13, the tag ID update unit 14 requests the server 3 to create a new tag ID. By way of example, the tag ID update unit 14 transmits a creation request of a new tag ID, which contains the current ID 20 and a physical location acquired by the physical acquiring unit 12, to the server 3. Further, the tag ID update unit 14 overwrites the tag ID 20 of the electronic tag 2 with a new tag ID assigned by the server 3.

In addition, the tag ID update unit 14 requests the server 3 to perform update with the overwritten new tag ID 20.

The tag ID update unit 34 updates the tag information DB 311A with the new tag ID 20 with which a request for update has been issued by the terminal 1. For example, upon accepting an update request of the new tag ID 20 from the terminal 1, the tag ID update unit 34 updates the tag information DB 311A such that the tag ID 311c corresponding to the tag name of the electronic tag 2 contained in the update request is updated with the new tag ID 20.

At a given timing, the tag ID enable timing determination unit 35 enables the new tag ID 20 with which the update has been performed by the tag ID update unit 34. For example, regarding the new tag ID 20 updated by the tag ID update unit 34, the tag ID enable timing determination unit 35 references the work schedule DB 312 and enables the tag ID 20 at a timing before the next reading of the tag ID 20 from the electronic tag 2. The given timing is immediately before a worker next visits this work destination in order to carry out work.

The determination of whether or not the time is immediately before the next visit is made, for example, as follows. By way of example, when work is not shared with another person, the tag ID enable timing determination unit 35 references the work schedule DB 312 and acquires, among records that correspond to the worker 312c who is currently working and to the work destination 312d of the current work, the work date and time 312e and the work location 312f of a record of the next work schedule. That is, when work is not shared with another person, the tag ID enable timing determination unit 35 acquires a timing at which the same worker as the worker who is currently working next visits the same work destination for the same work. In addition, when work is shared with another person, the tag ID enable timing determination unit 35 references the work schedule DB 312 and acquires, among records that correspond to the worker 312c who currently shares work and the work destination 312d of the current work, the work date and time 312e and the work location 312f of a record of the next work schedule. That is, when work is shared with another person, the tag ID enable timing determination unit 35 acquires a timing at which a worker who currently shares work next visits the same work destination for the same work. Further, when acquiring only the work date and time 312e, the tag ID enable timing determination unit 35 enables the new tag ID 20 a specified amount of time prior to the work date and time 312e. By way of example but not of limitation, the specified amount of time is 30 minutes. When acquiring only the work location 312f, the tag ID enable timing determination unit 35 enables the new tag ID 20 when the next worker 312c is close, within a specified distance, to the work location 312f. By way of example but not of limitation, the specified distance is 1 km. When acquiring the work date and time 312e and the work location 312f, the tag ID enable timing determination unit 35 enables the new tag ID 20 when the next worker 312c is close at the specified distance to the work location 312f the specified amount of time prior to the work date and time 312e.

Figure 8:
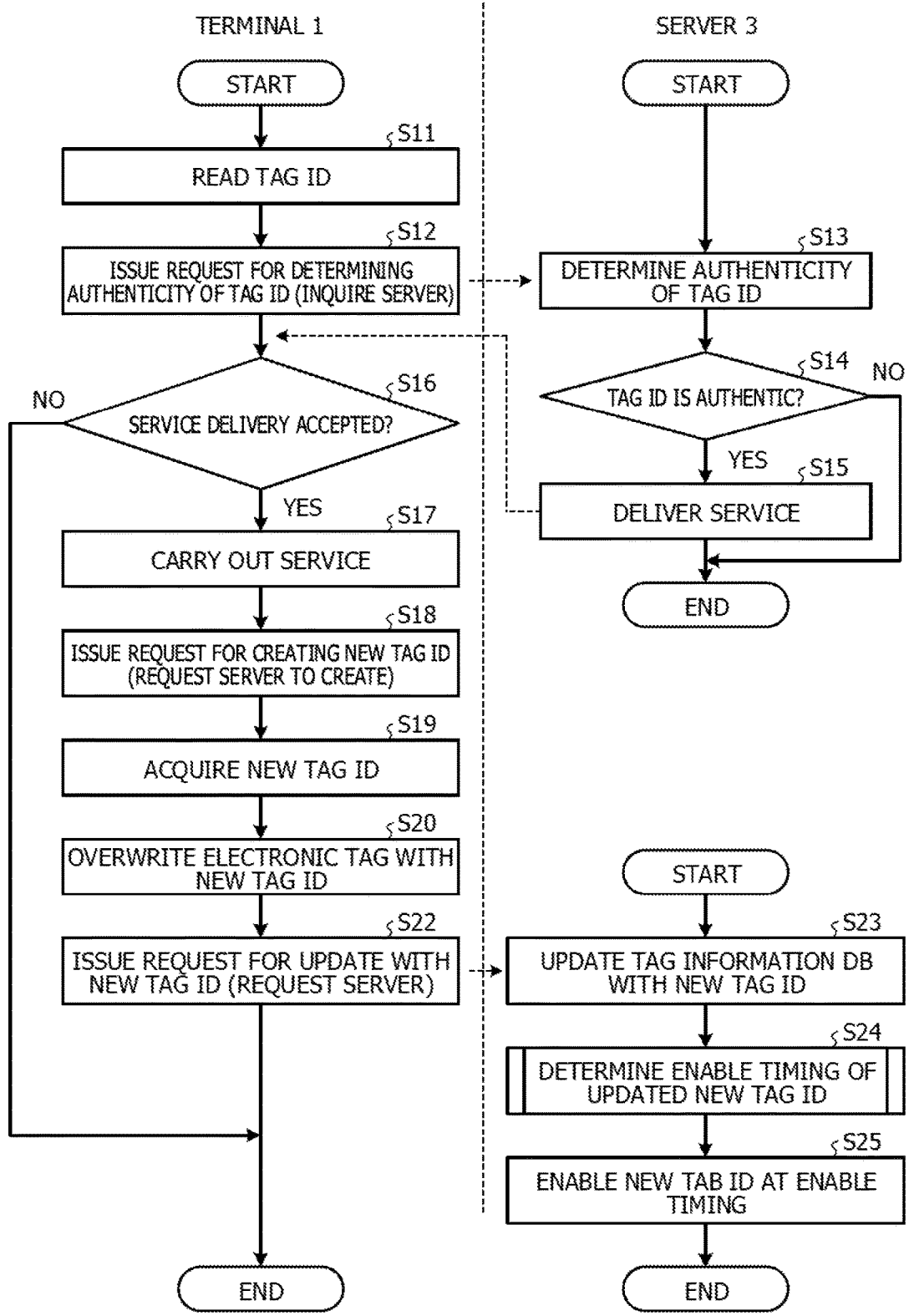
FIG. 8 is a diagram illustrating an example of a flowchart of a process for information delivery according to the second embodiment.

Next, an example of a processing procedure of a process for information delivery according to the second embodiment will be described with reference to FIG. 8. FIG. 8 is a diagram illustrating an example of a flowchart of a process for information delivery according to the second embodiment. Note that the same steps as in the flowchart of the process for information delivery illustrated in FIG. 4 are denoted by the same reference numerals and the overlapping steps are simply described or are not described. The terminal 1 is assumed to enter a range where the terminal 1 is able to communicate wirelessly with the electronic tag 2.

As illustrated in FIG. 8, in the terminal 1, the tag ID reading unit 11 reads the tag ID 20 from the electronic tag 2 (S11). The physical location acquiring unit 12 acquires the physical location of the terminal 1, transmits the acquired physical location together with the tag ID 20 to the server 3, and requests the server 3 to determine the authenticity of the tag ID 20 (S12).

In the server 3, the authenticity determination unit 32 references the tag information DB 311A and the work schedule DB 312 to determine the authenticity of the tag ID 20 (S13). The authenticity determination unit 32 determines whether or not the tag ID 20 is authentic (S14). If it is determined that the tag ID 20 is authentic (Yes in S14), the service delivery unit 33 delivers a service corresponding to the tag ID 20 to the terminal 1 (S15). On the other hand, if it is determined that the tag ID 20 is not authentic (No in S14), the service delivery unit 33 terminates the process for information delivery.

In the terminal 1, the service carry-out unit 13 determines whether or not delivery of a service has been accepted (S16). If it is determined that delivery of a service has not been accepted (No in S16), the service carry-out unit 13 terminates the process for information delivery. On the other hand, if it is determined that delivery of a service has been accepted (Yes in S16), the service carry-out unit 13 carries out the accepted service (S17).

The tag ID update unit 14 requests the server 3 to create a new tag ID (S18). The tag ID update unit 14 acquires a new tag ID created by the server 3 from the server 3 (S19). The tag ID update unit 14 overwrites the tag ID 20 of the electronic tag 2 with the new tag ID (S20).

Further, the tag ID update unit 14 requests the server 3 to perform update with the overwritten new tag ID 20 (S22).

In the server 3, the tag ID update unit 34 updates the tag information DB 311A with the new tag ID 20 with which a request for update has been issued by the terminal 1 (S23). Further, the tag ID enable timing determination unit 35 determines an enable timing of the new tag ID 20 (S24). Note that the enable timing determination process is the same as steps of the update request timing determination process illustrated in FIG. 5 and the overlapping steps are not described.

Further, the tag ID enable timing determination unit 35 enables the new tag ID 20 at the determined enable timing (S25). For example, for the tab information DB 311A, the tag ID enable timing determination unit 35 sets the enable 311d corresponding to the tag ID 311c that matches the new tag ID 20 to be "TRUE", which indicates that the tag ID is enabled.

In this way, in the second embodiment described above, the system 9 includes the terminal 1, the electronic tag 2, and the server 3. The terminal 1 reads the tag ID 20 from the electronic tag 2 and, for the electronic tag 2, updates the read tag ID 20 with a tag ID 20 that is different from the tag ID 20 in question. The terminal 1 requests the server 3 to perform update with the updated tag ID 20. The server 3 updates the tag information DB 311A with the updated tag ID 20. Further, the server 3 references the work schedule DB 312 and enables the updated tag ID 20 at a timing before the next reading of the tag ID 20 from the electronic tag 2. With such a configuration, each time the user uses information delivery, the system 9 updates the tag ID 20 of the electronic tag 2 and avoids reflecting the update in the server 3 until a timing before the next reading of the tag ID 20 from the electronic tag 2. Accordingly, even if a third party copies the tag ID 20 read from another terminal 1 possessed by the third party or the terminal 1 that has been stolen, it is possible to inhibit the third party from impersonating a legitimate person by using the copied tag ID 20. That is, after determining the timing at which the tag ID 20 updated in the electronic tag 2 is to be reflected in the tag information DB 311A of the server 3, the system 9 enables the tag ID 20. Therefore, the tag ID 20 is not able to be used until the timing of enabling. This makes it possible to improve the safety. In addition, the system 9 implements such a configuration without adding hardware to the electronic tag 2, making it possible to implement the configuration at low cost.

Note that it has been described that the update request timing determination unit 15 of the terminal 1 according to the first embodiment references the work schedule DB 312 stored in the server 3 to, at a timing before the next reading of the tag ID 20 from this electronic tag 2, request the server 3 to perform update with the new tag ID 20. However, the update request timing determination unit 15 may reference a work schedule DB stored in the terminal 1 to, at a timing before the next reading of the tag ID 20 from this electronic tag 2, request the server 3 to perform update with the new tag ID 20. The work schedule DB stored in the terminal 1 may be, by way of example, transferred from the server 3 at a time point at which the work schedule DB 312 of the server 3 is changed. This allows the update request timing determination unit 15 to acquire the update timing of a new tag ID without having a communication load.

In addition, all of the components of devices illustrated in the drawings do not necessarily have to be physically configured as illustrated in the drawings. That is, specific manners of distribution and integration of devices are not limited to those illustrated in the drawings, and all or some of the devices may be configured so as to be functionally or physically distributed and integrated at arbitrary units in accordance with various types of loads and usage states. For example, the update request timing determination unit 15 may be divided into the case where work is not shared with another person and the case where work is shared. In addition, the memory 31 may be coupled as an external device of the server 3 via a network.

Figure 9:
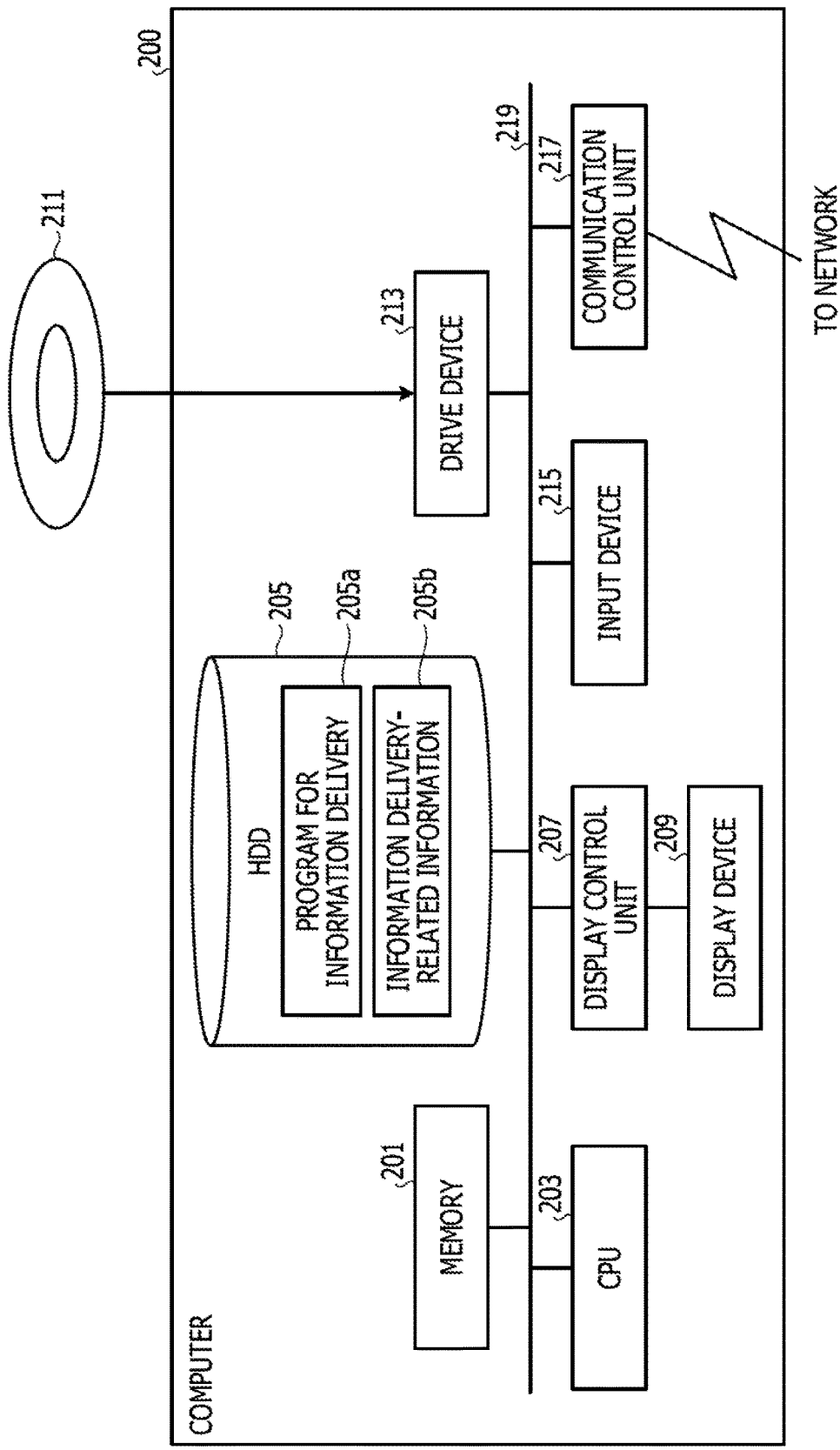
FIG. 9 is a diagram illustrating an example of a computer that executes a program for information delivery.

In addition, various types of processing described in the above embodiments may be implemented by programs prepared in advance executed by a computer, such as a personal computer or a work station. Accordingly, hereinafter, description will be given of an example of a computer that executes a program for information delivery that implements functionalities similar to those of the terminal 1 and the server 3 illustrated in FIG. 1. FIG. 9 is a diagram illustrating an example of a computer that executes a program for information delivery.

As illustrated in FIG. 9, a computer 200 includes a central processing unit (CPU) 203 that executes various types of arithmetic processing, an input device 215 that accepts input of data from the user, and a display control unit 207 that controls a display device 209. The computer 200 also includes a drive device 213 that reads a program and the like from a recording medium, and a communication control unit 217 that transmits and receives data to and from another computer over a network. The computer 200 also includes a memory 201 that temporarily stores various types of information, and a hard disk drive (HDD) 205. Further, the memory 201, the CPU 203, the HDD 205, the display control unit 207, the drive device 213, the input device 215, and the communication control unit 217 are coupled by a bus 219.

The drive device 213 is a device for, for example, a removable disk 211.

The CPU 203 reads a program 205*a* for information delivery, loads the program 205*a* onto the memory 201, and executes the program 205*a* as a process. Such a process corresponds to each of function units of the terminal 1 and the server 3. Information delivery-related information 205*b* corresponds to the tag information DB 311 and the work schedule DB 312 in the server 3. Further, for example, the removable disk 211 stores various types of information, such as the program 205*a* for information delivery.

Note that the program 205*a* does not necessarily have to be originally stored in the HDD 205. For example, the program is stored in a "portable physical medium", such as a floppy disk (FD), a compact disk read-only memory (CD-ROM), a digital video disk (DVD), an optical magnetic disk, or an integrated circuit (IC) card, which is inserted in the computer 200. Further, the computer 200 may read and execute the program 205*a* from such a medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. For example, the steps recited in any of the method or process descriptions may be executed in any order and are not limited to the order presented.

What is claimed is:

1. A system for information delivery, the system comprising:
    an electronic tag configured to hold a tag identifier that is updatable;
    a server configured to store the tag identifier held in the electronic tag and information corresponding to the tag identifier, and deliver information based on the tag identifier; and
    a terminal that configured to cause information corresponding to the tag identifier held in the electronic tag to be transmitted from the server, wherein
    the terminal includes
        a memory, and
        a processor coupled to the memory and configured to
            read the tag identifier from the electronic tag,
            update the tag identifier in the electronic tag by overwriting the electronic tag with a new tag identifier that is different in content from the tag identifier read from the electronic tag, and
            establish, after updating the tag identifier in the electronic tag, a time period in which a discrepancy between the tag identifier in the electronic tag and the tag identifier stored in the server occurs, by delaying a transmission timing of an update request to update the tag identifier stored in the server with the new tag identifier, or by causing the server to delay enabling the tag identifier stored in the server and updated with the new tag identifier,
    wherein the system is configured in at least either one of a first manner and a second manner,
    in the first manner, the terminal is configured to identify, as a timing for transmitting the update request, any timing before a timing at which the tag identifier is to be next read from the electronic tag, by referencing a use timetable that stores a use schedule of a user who uses the information, and transmits the update request to the server at the identified timing,
    in the first manner, the server is configured to update, upon receiving the update request from the terminal, the tag identifier held in the memory with the new tag identifier,
    in the second manner, the terminal is configured to transmit an update request to the server at a timing at which the tag identifier in the electronic tag is updated, and
    in the second manner, the server is configured to
        receive the update request from the terminal,
        update, at a timing at which the update request is received from the terminal, the tag identifier stored in the memory with the new tag identifier, and disable the tag identifier updated,
        identify any timing before a timing at which the tag identifier is to be next read from the electric tag, by referencing a use timetable that stores a use schedule of a user who uses the information, and
        enable, at the identified timing after the updating, the tag identifier stored in the memory.

2. The system according to claim 1,
wherein the identified timing is immediately before next reading the tag identifier from the electronic tag.

3. A method implemented in a system including an electronic tag configured to hold a tag identifier that is updatable, a server configured to store the tag identifier held in the electronic tag and information corresponding to the tag identifier, and a terminal that configured to cause information corresponding to the tag identifier held in the electronic tag to be delivered from the server, the method comprising:

under control of the terminal of the system,
reading the tag identifier from the electronic tag,
updating the tag identifier in the electronic tag by overwriting the electronic tag with a new tag identifier that is different in content from the tag identifier read from the electronic tag, and
establishing, after updating the tag identifier in the electronic tag, a time period in which a discrepancy between the tag identifier in the electronic tag and the tag identifier stored in the server occurs, by delaying a transmission timing of an update request to update the tag identifier stored in the server with the new tag identifier, or by causing the server to delay enabling the tag identifier stored in the server and updated with the new tag identifier, wherein the method is configured in at least either one of a first manner and a second manner, in the first manner, by the terminal,
identifying, as a timing for transmitting the update request, any timing before a timing at which the tag identifier is to be next read from the electronic tag, by referencing a use timetable that stores a use schedule of a user who uses the information, and transmits the update request to the server at the identified timing, in the first manner, by the server,
updating, upon receiving the update request from the terminal, the tag identifier held in the memory with the new tag identifier, in the second manner, by the terminal,
transmitting an update request to the server at a timing at which the tag identifier in the electronic tag is updated, and in the second manner, by the server,
receiving the update request from the terminal,
updating, at a timing at which the update request is received from the terminal, the tag identifier stored in the memory with the new tag identifier, and disable the tag identifier updated,
identifying any timing before a timing at which the tag identifier is to be next read from the electric tag, by referencing a use timetable that stores a use schedule of a user who uses the information, and
enabling, at the identified timing after the updating, the tag identifier stored in the memory.

4. The method according to claim 3,
wherein the identified timing is immediately before next reading the tag identifier from the electronic tag.

5. A non-transitory computer-readable storage medium storing a program that causes a processor to execute a process, the process comprising:
reading a tag identifier from an electronic tag;
updating the tag identifier in the electronic tag by overwriting the electronic tag with a new tag identifier that is different in content from the tag identifier read from the electronic tag; and
establishing, after updating the tag identifier in the electronic tag, a time period in which a discrepancy between the tag identifier in the electronic tag and the tag identifier stored in the server occurs, by delaying a transmission timing of an update request to update the tag identifier stored in the server with the new tag identifier, or by causing the server to delay enabling the tag identifier stored in the server and updated with the new tag identifier,
wherein the process further includes
identifying, as a timing for transmitting the update request, any timing before a timing at which the tag identifier is to be next read from the electronic tag, by referencing a use timetable that stores a use schedule of a user who uses the information, and
transmitting the update request to the server at the identified timing.

6. The non-transitory computer-readable storage medium according to claim 5,
wherein the identified timing is immediately before next reading the tag identifier from the electronic tag.

* * * * *